US009882621B2

(12) United States Patent
Kasher et al.

(10) Patent No.: US 9,882,621 B2
(45) Date of Patent: Jan. 30, 2018

(54) TECHNIQUES USING A FIRST BAND OF COMMUNICATION TO SYNCHRONIZE BEAMFORMING FOR A SECOND BAND OF COMMUNICATION

(71) Applicant: Intel IP Corporation, Santa Clara, CA (US)

(72) Inventors: Assaf Kasher, Haifa (IL); Solomon Trainin, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 238 days.

(21) Appl. No.: 14/750,374

(22) Filed: Jun. 25, 2015

(65) Prior Publication Data

US 2016/0380685 A1  Dec. 29, 2016

(51) Int. Cl.
| | | |
|---|---|---|
| *H04B 7/06* | (2006.01) | |
| *H04L 5/00* | (2006.01) | |
| *H04J 3/06* | (2006.01) | |
| *H04W 8/22* | (2009.01) | |
| *H04W 72/04* | (2009.01) | |

(52) U.S. Cl.
CPC .......... *H04B 7/0617* (2013.01); *H04J 3/0697* (2013.01); *H04L 5/0055* (2013.01); *H04W 8/22* (2013.01); *H04W 72/044* (2013.01); *H04W 72/048* (2013.01)

(58) Field of Classification Search
CPC  H04B 7/0617; H04W 72/044; H04W 72/048; H04L 5/0055
USPC ......................................................... 370/329
See application file for complete search history.

(56) References Cited

U.S. PATENT DOCUMENTS

| | | | | |
|---|---|---|---|---|
| 8,379,560 | B2 * | 2/2013 | Kessleman | H04W 48/12 370/314 |
| 2011/0064033 | A1 | 3/2011 | Gong et al. | |
| 2011/0080898 | A1 * | 4/2011 | Cordeiro | H04B 7/0617 370/338 |
| 2011/0149842 | A1 | 6/2011 | Cordeiro | |
| 2012/0057580 | A1 * | 3/2012 | Hansen | G01S 1/02 370/338 |
| 2013/0089000 | A1 | 4/2013 | Hansen et al. | |
| 2014/0044112 | A1 | 2/2014 | Stephens et al. | |
| 2014/0369330 | A1 * | 12/2014 | Sinha | H04W 8/005 370/338 |
| 2015/0049744 | A1 | 2/2015 | Liu et al. | |

(Continued)

OTHER PUBLICATIONS

International Search Report and Written Opinion received for PCT Patent Application No. PCT/US2016/034177, dated Aug. 16, 2016, 9 pages.

*Primary Examiner* — Asad Nawaz
*Assistant Examiner* — Saad A Waqas

(57) ABSTRACT

Various embodiments are generally directed to an apparatus, method and other techniques to send an indication in a first frequency band of communication, the indication sent in a beacon message and to indicate a capability to communicate in a second frequency band of communication. Embodiments may include techniques to send beamforming information for the second frequency band of communication in the first frequency band of communication, and perform a beamforming operation for the second frequency band of communication using the beamforming information communicated in the first frequency band of communication.

18 Claims, 12 Drawing Sheets

(56) References Cited

U.S. PATENT DOCUMENTS

| | | | | |
|---|---|---|---|---|
| 2015/0288427 A1* | 10/2015 | Wang | ................ | H04W 72/1273 370/329 |
| 2015/0289147 A1* | 10/2015 | Lou | ...................... | H04B 7/0408 370/329 |
| 2016/0044711 A1* | 2/2016 | Lou | ................... | H04W 74/0816 370/338 |
| 2016/0191132 A1* | 6/2016 | Rajagopal | .............. | H04B 7/088 370/329 |
| 2017/0086211 A1* | 3/2017 | Sahin | ................... | H04W 74/04 |

\* cited by examiner

*850*

```
┌─────────────────────────────────────────────┐
│ SEND AN INDICATION IN A FIRST FREQUENCY BAND OF │
│ COMMUNICATION, THE INDICATION SENT IN A PROBE │
│ REQUEST AND TO INDICATE A CAPABILITY TO      │
│ COMMUNICATE IN A SECOND FREQUENCY BAND OF   │
│ COMMUNICATION                                │
│ 855                                          │
└─────────────────────────────────────────────┘
                      │
┌─────────────────────────────────────────────┐
│ SEND BEAMFORMING INFORMATION FOR THE SECOND │
│ FREQUENCY BAND OF COMMUNICATION IN THE FIRST │
│ FREQUENCY BAND OF COMMUNICATION             │
│ 860                                          │
└─────────────────────────────────────────────┘
                      │
┌─────────────────────────────────────────────┐
│ PERFORM A BEAMFORMING OPERATION FOR THE SECOND │
│ FREQUENCY BAND OF COMMUNICATION USING THE   │
│ BEAMFORMING INFORMATION COMMUNICATED IN THE │
│ FIRST FREQUENCY BAND OF COMMUNICATION       │
│ 865                                          │
└─────────────────────────────────────────────┘
```

*FIG. 8B*

TECHNIQUES USING A FIRST BAND OF COMMUNICATION TO SYNCHRONIZE BEAMFORMING FOR A SECOND BAND OF COMMUNICATION

TECHNICAL FIELD

Embodiments described herein generally relate techniques using a first frequency band for beamforming refinement of a second frequency band.

BACKGROUND

Wireless communication systems communicate information over a shared wireless communication medium such as one or more portions of the radio-frequency (RF) spectrum. Recent innovations in Millimeter-Wave (mmWave) communications operating at the 60 Gigahertz (GHz) frequency band promises several Gigabits-per-second (Gbps) throughput. The next generation 60 GHz standard may be applied to new applications, such as outdoor access and backhaul. These new applications may require longer ranges, e.g. 100 meters (m), than what is currently being used. These longer ranges may require larger antenna arrays with higher gains. In order to perform beamforming training algorithms for these longer ranges longer training sequences may be required. However, longer training sequences may be undesirable.

BRIEF DESCRIPTION OF THE DRAWINGS

FIG. 8B illustrates an example embodiment of a second logic flow diagram.

DETAILED DESCRIPTION

Figure 1:
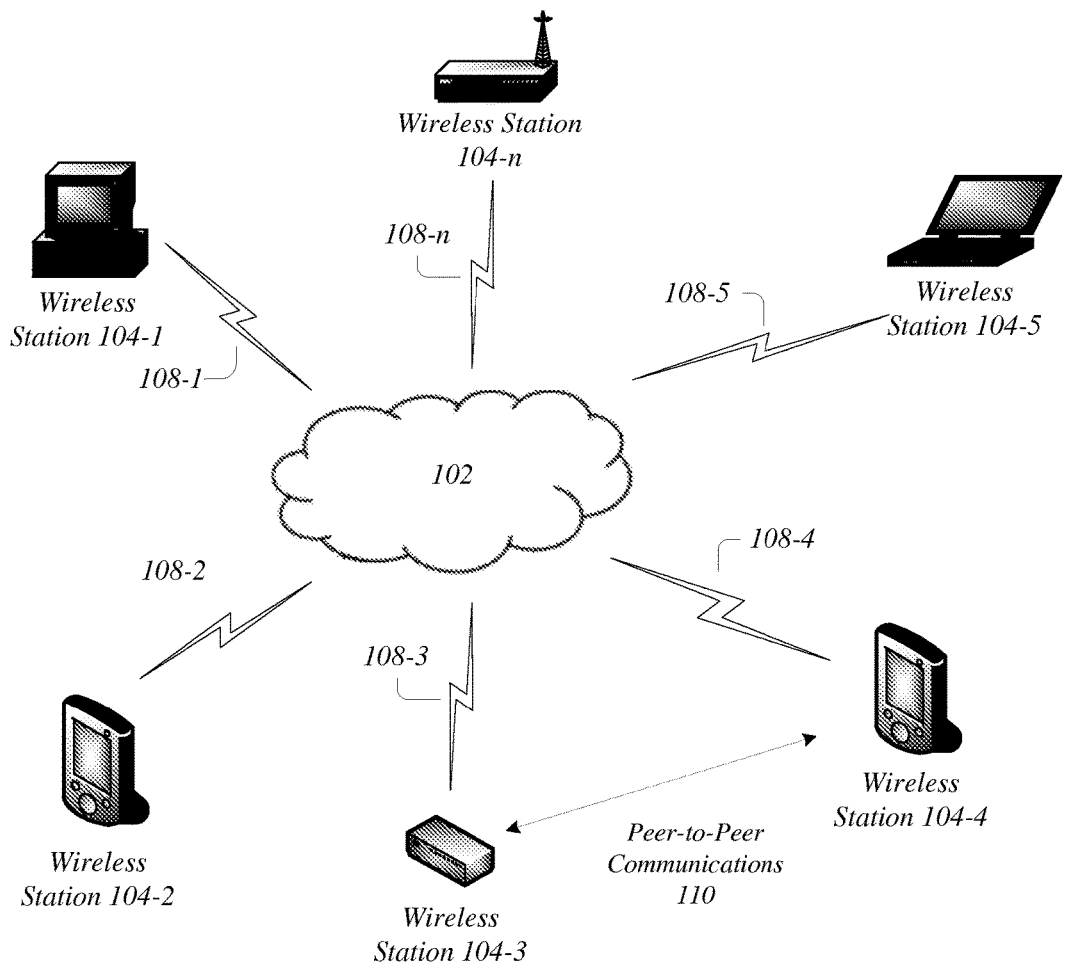
FIG. 1 illustrates an example embodiment of a computing system.

Various embodiments are generally directed to techniques for operation in accordance with one or more specification, standards or variants suitable for wireless communications. For example, various embodiments may include communications in and around the 60 Gigahertz (GHz) frequency band as defined by Wireless Gigabit Alliance Wireless Gigabit ("WiGig") Specification Version 1.0, according to Institute of Electrical and Electronics Engineers (IEEE) Standard 802.11ad-2012, published December 2012, titled "Amendment 3: Enhancements for Very High Throughput in the 60 GHz Band," ("IEEE 802.11ad-2012") or according to any predecessors, revisions, or variants thereof (collectively, "WiGig/802.11ad Standards"). Embodiments may also operate in accordance with one or more of the WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations. Further, some embodiments may be directed for operation in accordance with the next generation (NG) 60 GHz communication standard, such as IEEE 802.11ay Next Generation 60 GHz (hereinafter "NG60") or any other wireless standards as promulgated by other standards organizations. Various embodiments are not limited in this manner.

Moreover, embodiments may be directed to Wi-Fi communications in and around the 2.4 GHz and 5 GHz frequency bands. These Wi-Fi communications may be in accordance with one or more standards, such as any one of the IEEE 802.11 standards including, but not limited to, IEEE 802.11a, 802.11b, 802.11g, 802.11n, 802.11ac, 802.11ax, and other derivatives of these standards (collectively, "Wi-Fi Standards).

Some embodiments may include systems, apparatuses, devices, and so forth capable of operating in any number of frequency bands. For example, various embodiments may include one or more devices having a first transceiver capable of operating and communicating in a lower frequency band such as the 2.4 GHz frequency band and/or the 5 GHz frequency band, e.g. Wi-Fi frequency bands. In addition, these devices may include a second transceiver capable of operating in a higher frequency band such as the 60 GHz frequency band. In some embodiments, the first and second transceivers may be the same transceiver. Various embodiments are not limited in this manner and in some embodiments, the first and second transceivers may be separate devices or transceivers.

Embodiments may include one or more wireless stations communicating an indication in a first frequency band of communication, such as a lower frequency band (2.4 GHz and 5 GHz), indicating the capability to communicate in a second frequency band of communication, such as a higher frequency band (60 GHz). The indication may be communicated in a number of different ways, such as in a beacon message, a probe request, a probe response, or any other type of message. For example, an access point may communicate the indication in a beacon message communicated to any number of wireless stations. In another example, a wireless station may communicate the indication to an access point in a probe request message. In some embodiments a new 60 GHz capability field, indicating whether a device supports or does not support communicating in the 60 GHz frequency band, may be added to any one of the messages and/or to a Wi-Fi capability information field. Embodiments are not limited to these examples.

In some embodiments, one or more wireless devices may communicate beamforming information for the higher frequency band of communication (60 GHz) in the lower frequency band of communication (2.4 GHz and 5 GHz). The beamforming information may be based on beamforming conducted for the lower frequency band of operation and may include beamforming training information, such as a number of transmitter (TX) sectors and antennas for training and a number of receiver (RX) sectors and antennas for training. Further, the beamforming information may indicate a beamforming pattern reciprocity capability. Embodiments are not limited in this manner.

The beamforming information may be communicated between devices in one or more messages on the lower frequency band of communication. For example, a wireless station may communicate beamforming information to an access point in an information element of a probe request message. Similarly and in another example, the access point may communicate beamforming information to a wireless station in an information element of a beacon message, probe response message and so forth. Various embodiments are not limited in this manner. For example, other message types may be used to communicate the beamforming information between devices.

Embodiments may also include wireless devices performing a beamforming operation for the higher band of communication using at least the beamforming information communicated in the lower frequency band of communication. The beamforming operation may include using beamforming information based on beamforming done for the lower frequency band of communication to provide a coarse direction for a wireless device and therefore narrow a field of search.

Further, the beamforming operation may be initiated by a start beamforming packet and acknowledgement packet, and in some instances a wakeup request may be communicated to wake a transceiver for communicating in the higher frequency band of operation from a sleep state. The beamforming operation may also include communicating one or more sector sweep packets in the higher band of communication and communicating one or more sector sweep feedback packets in the lower frequency band of operation. In some embodiments, a best sector may be indicated in a sector sweep feedback packet. The sector sweep packets and sector sweep feedback packets communicated between devices may be used to train the transmitter (TX) and receivers (RX) of the devices. These and other details will become more apparent in the following description.

Reference is now made to the drawings, wherein like reference numerals are used to refer to like elements throughout. In the following description, for purposes of explanation, numerous specific details are set forth in order to provide a thorough understanding thereof. It may be evident, however, that the embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram of one embodiment of a communications system 100. In various embodiments, the communications system 100 may include multiple stations or devices. A station generally may include any physical or logical entity for communicating information in the communications system 100 and may be implemented as hardware, software, or any combination thereof, as desired for a given set of design parameters or performance constraints. Although FIG. 1 may show a limited number of stations by way of example, it can be appreciated that more or less stations may be employed for a given implementation.

In various embodiments, the communications system 100 may include, or form part of a wired communications system, a wireless communications system, or a combination of both. For example, the communications system 100 may include one or more stations arranged to communicate information over one or more types of wired communication links. Examples of a wired communication link, may include, without limitation, a wire, cable, bus, printed circuit board (PCB), Ethernet connection, peer-to-peer (PTP) connection, backplane, switch fabric, semiconductor material, twisted-pair wire, co-axial cable, fiber optic connection, and so forth. The communications system 100 also may include one or more stations arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The communications system 100 may communicate information in accordance with one or more standards as promulgated by a standards organization. In one embodiment, for example, various devices including part of the communications system 100 may be arranged to operate in accordance with any specification or standards, such as the WiGig/802.11ad Standards, Wi-Fi Standards, NG60 Standard, and so forth.

Further, the communications system 100 may communicate, manage, or process information in accordance with one or more protocols. A protocol may include a set of predefined rules or instructions for managing communication among stations. In various embodiments, for example, the communications system 100 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. The embodiments are not limited in this context.

As shown in FIG. 1, the communications system 100 may include a network 102 and a plurality of wireless stations 104-n, where n may represent any positive integer value. In various embodiments, the wireless stations 104-n may be implemented as various types of wireless devices. Examples of wireless devices may include, without limitation, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, media server, digital music player, set-top box (STB), appliance, workstation, user terminal, mobile unit, consumer electronics, television, digital television, high-definition television, television receiver, high-definition television receiver, and so forth. In the illustrated embodiment shown in FIG. 1, the wireless stations 104-n may include a PC 104-1, a digital TV 104-2, a media source 104-3 (e.g., a CD, DVD, media file server, etc.), a handheld device 104-4, and a laptop or notebook 104-5. These are merely a few examples, and the embodiments are not limited in this context.

In some embodiments, the wireless stations 104-n may include one more wireless interfaces and/or components for wireless communication such as one or more transmitters, receivers, transceivers, chipsets, amplifiers, filters, control logic, network interface cards (NICs), antennas, antenna arrays, modules and so forth. Examples of an antenna may include, without limitation, an internal antenna, an omni-directional antenna, a monopole antenna, a dipole antenna, an end fed antenna, a circularly polarized antenna, a microstrip antenna, a diversity antenna, a dual antenna, an antenna array, and so forth.

In various embodiments, the wireless stations 104-n may include or form part of a wireless network 102. More specifically, the wireless stations 104-n may be directional multi-gigabit (DMG) stations (STAs) operative to communicate over wireless network 102 according to one or more standards. Although some embodiments may be described with the wireless network 102 implemented as 60 GHz wireless network for purposes of illustration, and not limitation, it can be appreciated that the embodiments are not limited in this context. For example, the wireless network 102 may include or be implemented as various types of wireless networks and associated protocols suitable for a WVAN, WPAN, WLAN, WMAN, Wireless Wide Area Network (WWAN), Broadband Wireless Access (BWA) network, a radio network, a cellular radiotelephone network, a cable network, a television network, a satellite network such as a direct broadcast satellite (DBS) network, and/or any other wireless communications network configured to operate in accordance with the described embodiments.

In some embodiments, the wireless network 102 may support dual-band communication. For example, various embodiments may include wireless stations 104-n communicating via a first band of communication and a second band of communication with other wireless stations 104-n. The first band of communication may be a lower band of communication, such as the 2.4 GHz and/or 5 GHz band of communication, and the second band of communication may be a higher band of communication, such as the 60 GHz band of communication. For example, embodiments may include communicating capability information, beamforming information, and synchronization information on the lower band of communication and performing beamforming operations for a higher band of communication based on the information communicated on the lower band of communication. In addition, the beamforming operations may include communicating one or more training sequences and/or sector sweep packets on a higher band of communication and sector sweep feedback packets on a lower band of communication. Communicating information on the lower frequency band may be advantages because it enables a longer range of communication in the higher frequency band of communication.

The network 102 allows for peer-to-peer or ad hoc network communications 110 where the wireless stations 104-n may communicate directly with each other without necessarily needing a fixed device, such as a wireless access point. In embodiments, for example, the network 102 provides for contention-based medium access, such as carrier sense multiple access (CSMA) technique, often combined with a collision avoidance (CA) technique for wireless networks (CSMA/CA). The CSMA/CA technique is intended to provide fair and equal access to the wireless stations 104-n, where each wireless station 104-n listens to the wireless shared medium before attempting to communicate. To accommodate bandwidth demanding and time-sensitive information, such as audio/video (AV) or multimedia streams, the network 102 may implement QoS techniques to implement controlled fairness. Traffic having a higher priority is given preferential access to the wireless shared medium, for example. Various embodiments are not limited to the above-recited examples and other configurations may be contemplated.

Figure 2:
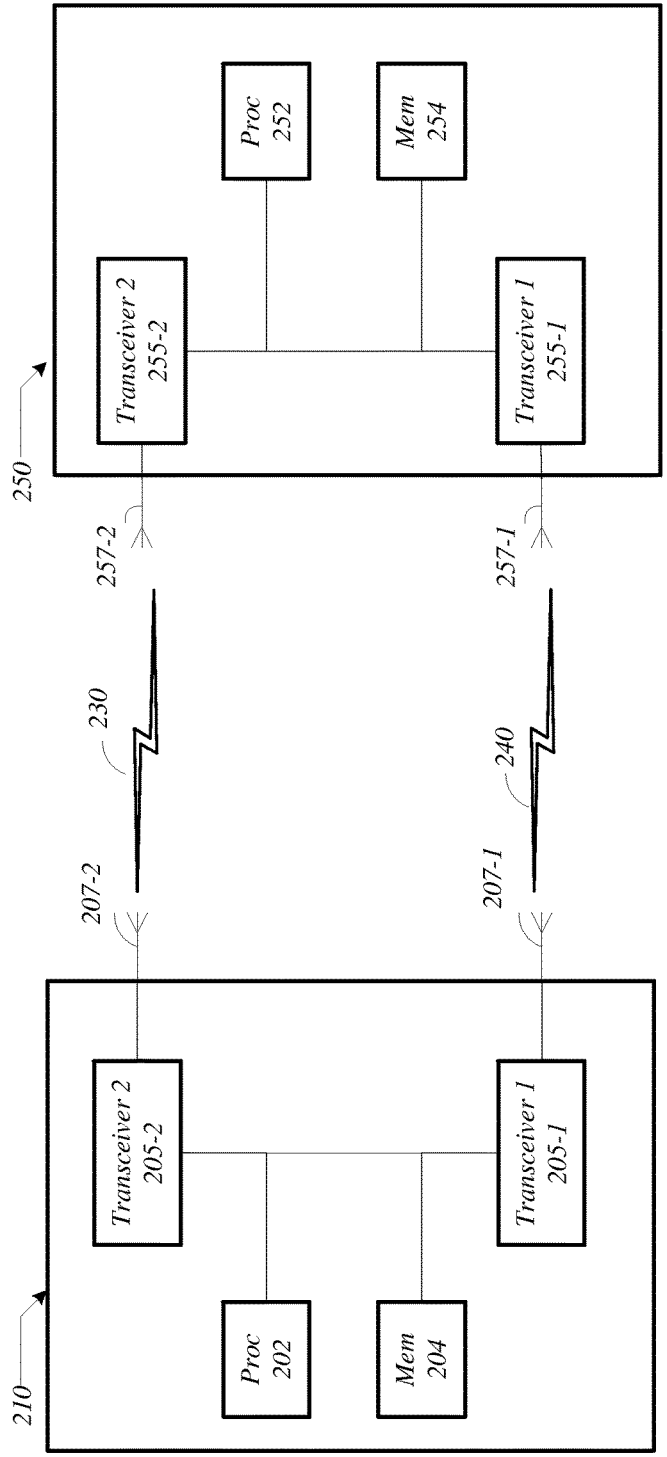
FIG. 2 illustrates an example embodiment of a second computing system.

FIG. 2 illustrates an example embodiment of computing system 200 having stations 210 and 250. In embodiments, stations 210 and 250 may operate in accordance with one or more standards, such as the WiGig/802.11ad Standards, the Wi-Fi Standards, and NG60 standard, as previously discussed above in FIG. 1. In some embodiments, station 210 may be any type of device or station including a wireless device, computing device, PDA, and so forth, and the station 250 may be an access point capable of communicating with any number of devices and allows wireless stations to connect to a wired network. For example, the access point usually connects to a router (via a wired network) as a standalone device, but it can also be an integral component of the router itself. The access point may allow wireless stations to connect to the Internet and other wired or wireless networks. In some embodiments, station 250 may be a non-AP device, such as private basic service set (PBSS) control point (PCP). For example, all of the communications, operations, embodiments, and so forth discussed herein may be performed by a PCP in a peer-to-peer network with another STA.

In some embodiments, the wireless stations 210 and 250 may include a number of components which may be implemented in hardware only, software only, or some combination of hardware and software. The components of wireless station 250 may include a processor 202, a memory 204, a first transceiver 205-1, and a second transceiver 205-2. Similarly, wireless station 250 may also including components, such as processor 252, a memory 254, a first transceiver 255-1, and a second transceiver 255-2. Although FIG. 2 illustrates wireless stations 210 and 250 having a limited number of components, various embodiments are not limited in this manner.

In embodiments, the wireless stations 210 and 250 may communicate with each other wirelessly using one or more wireless links, such as wireless links 230 and 240. In some embodiments, the wireless stations 210 and 250 may use the first transceivers 205-1 and 255-1, respectively to communicate on a lower band (e.g. 2.4 GHz and/or 5 GHz) via wireless link 240. Further, the wireless station 210 may use the second transceiver 205-2 to communicate on a higher band (60 GHz) via wireless link 230 with a second transceiver 255-2 of the wireless station 250. However, various embodiments are not limited in this manner. For example, the first transceivers 205-1 and 255-1 may communicate on a higher band of communication, and the second transceivers 205-2 and 255-2 may communicate on a lower band of communication. Further and in some embodiments, the first and second transceivers 205 and 255 of each of the wireless stations 210 and 250 may be the same transceiver capable of operating on different frequency bands, such as a lower frequency band and a higher frequency band. Various embodiments are not limited in this manner.

In some embodiments, the processors 202 and 252 may be any type of circuitry capable of processing information, data and communications including one or more processors, for example, a Central Processing Unit (CPU), a Digital Signal Processor (DSP), a microprocessor, a controller, a chip, a microchip, an Integrated Circuit (IC), or any other suitable multi-purpose or specific processor or controller. Processors 202 and 252 may, for example, process data and information for transmission between devices 210 and 250.

In embodiments, each of the transceivers 205-1, 205-2, 225-1 and 225-2 may include both a transmitter and a receiver. The transmitter may send information and data in packets and/or frames and the receiver may receive information and data in packets and/or frames. In addition, the transceivers 205-1, 205-2, 225-1 and 225-2 may be capable of communicating radio frequency (RF) transmissions and may be able to down-convert received RF signals and up-convert RF signals to send. In some embodiments, each of the transceivers 205-1, 205-2, 225-1 and 225-2 may be coupled with one or more antennas 207 and 257. For example, first transceiver 205-1 may be coupled with antenna 207-1 and second transceiver 205-2 may be coupled with antenna 207-2. Similarly, first transceiver 255-1 may be coupled with antenna 257-1 and second transceiver 255-2 may be coupled with antenna 257-2. However embodiments are not limited in this manner. For example, one or more antennas may be shared between the first and second transceivers 205-1 and 205-2 and/or transceivers 255-1 and 255-2.

In embodiments, each of the transceivers may be coupled with other components. For example, each of the transceivers 205-1, 205-2, 255-1, and 255-2 may be coupled with one or more frequency synthesizers. A frequency synthesizer may produce a desired output signal for their transceivers. In addition, the frequency synthesizers may be used for, among other things, frequency synthesis, frequency multiplication, pulse synchronization, tone decoding, AM and FM modulation and demodulation, and phase modulation and demodulation. Further, the transceivers may also be coupled with one or more clocks or crystal oscillators. A clock may provide a reference clock input signal for the transceivers.

In some embodiments, the wireless stations 210 and 250 may communicate with each other using directional signals. In other words, a signal may be aimed, sent, and received directionally by a device rather than broadcasting a signal in every direction. By communicating information directionally, longer distances of communication between wireless stations may be realized because all of the transmit power may be focused in one or a few sectors. However, to perform directional communication, the transceivers 205 and 255 and corresponding antennas 207 and 257 may need to be "trained" to determine a direction to send the signals. Thus, one or more beamforming operations may be performed to train the transmitters and receivers of the transceivers 205 and 255 to communicate directionally.

In addition, beamforming on one frequency band of communication, e.g. a lower frequency band, may be used to improve beamforming operations on a second frequency band of communication, e.g. a higher frequency band. For example and with reference FIG. 2, beamforming operations may be conducted on a lower frequency band of operation to train the first transceivers 205-1 and 255-1 of the wireless stations 210 and 250. The lower band beamforming training may provide a coarse direction from wireless device 210 to wireless 250, and vice versa. This beamforming information may be used to narrow a search field when performing beamforming operations for the higher frequency band of communication. For example, beamforming information such as a number of TX sectors and antennas and RX sectors and antennas for each for the wireless stations 210 and 250 based on the lower frequency beamforming may be communicated on the lower frequency band of communication. The beamforming information may be used to reduce the number of sectors of search when performing a beamforming operation for transceivers 205-2 and 255-2 on the higher band of communication. Once a beamforming operations have been conducted for the higher band of communication, the transceivers 205-2 and 255-2 may be able to communicate information at higher data rates than information communicated on the lower frequency band of operation.

Figure 3:
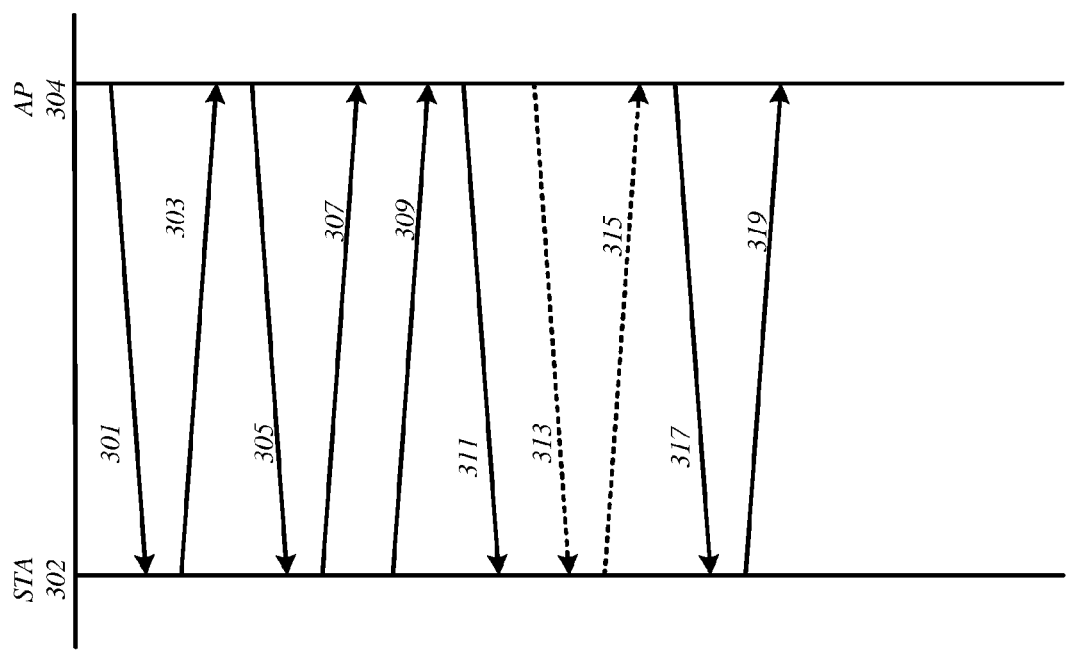
FIG. 3 illustrates an example embodiment of a communication processing diagram.

FIG. 3 illustrates an example embodiment of a first communication diagram 300 for wireless devices, such as a wireless station (STA) and an access point (AP). In this example embodiment, FIG. 3 illustrates communication occurring between a STA and an AP to determine whether each device is capable of communicating in a higher frequency band of communication, perform a beamforming operation on a lower frequency band of operation, and initiate (and perform) a beamforming operation on a higher frequency band of communication. In embodiments, the STA and AP may be similar to or the same as one of the wireless stations previously discussed above with respect to FIGS. 1, and 2, or any other devices discussed herein. Various embodiments are not limited in this manner.

At line 301, the access point (AP) may communicate an indication that it is capable of communicating on a higher frequency band of communication (60 GHz). The indication may be in capability information in beacon message that may be received by one or more wireless stations, such as STA 302. In some embodiments, the capability information may be communicated in an 802.11 capability information field of one or more packets of a beacon message sent between the AP 304 and the STA 302. Similarly and at line 303, the STA 302 may communicate an indication that it is capable of communicating in the higher frequency band of communication in a probe response message, for example. The capability information communicated by the STA 302 may also be in an 802.11 capability information field. However, embodiments are not limited in this manner.

In embodiments, at lines 305 and 307, the AP 304 and STA 302 may perform a beamforming operation to train transceivers for communicating on a lower frequency band of operation (2.4 GHz or 5 GHz). The beamforming operation may include communicating one or more training sequences between the AP 304 and the STA 302 on the lower frequency band of operation. In some embodiments, the beamforming operation performed on the lower frequency band may be in accordance with IEEE 802.1 lac or 802.11n, for example. Embodiments are not limited in this manner.

At line 309, the STA 302 may communicate beamforming information to the AP 304 on a lower frequency band of operation. The beamforming information may include a number of TX sectors and antennas and a number of RX sectors and antennas. Further, the beamforming information may also include the STA's 302 beamforming pattern reciprocity capability. At line 311, the AP 304 may also communicate beamforming information to the STA 302 on the lower frequency band of operation. This beamforming information may also include a number of TX sectors and antennas, a number of RX sectors and antennas, and the AP's beamforming pattern reciprocity capability.

In embodiments, at line 313, the AP 304 may optionally communicate a wakeup request in one or more packets to the STA 302. For example, STA 302 may include a transceiver associated with the higher band of communication in a lower power or sleep mode of operation until it is needed for communication. In this example, the wakeup request may be an indication to the STA 302 to wake the transceiver (and associated circuitry) from a lower power or sleep mode of operation. At line 315, the STA 302 may optionally communicate an acknowledgement (ACK) packet back to the AP 304 indicating that is ready to communicate on the higher band of communication, for example. However, embodiments are not limited in this manner. In some embodiments, transceivers may not be put into a lower power state or sleep mode and the wakeup request and ACK may not be communicated between the AP 304 and the STA 302.

At line 317, the AP 304 may initiate a beamforming operation for the higher frequency band of operation by communicating a start beamforming message in one or more packets to the STA 302. At line 319, the STA 302 may communicate an ACK management message in one or more packets in the lower frequency band of communication to the AP 304. The ACK management message may include an amount of time to wait after the end of the ACK management message before commencing the beamforming operation. For example, the ACK management message may include a time in N microseconds (u secs) to wait until after the end of the ACK management message to commence the beamforming operation for the higher frequency band of communication. The time value may be predetermined and in some embodiments may be defined in one or more of the standards previously discussed. Embodiments are not limited to this example.

In embodiments, the synchronization information including the beamforming information, the number of sectors that will be transmitted, the capability information, the start beamforming message, an ACK management message and the time to start the beamforming after the ACK message, may be used to synchronize the transmitter of one device with a receiver of another device, and vice versa. For example, the transmitter of AP may be synchronized with the receiver of the STA, and the transmitter of the STA may be synchronized with the receiver of the AP. Synchronizing antenna switching for the AP and STA typically would not be possible without communicating the synchronization information between the AP and STA on the lower frequency band of operation.

Figure 4:
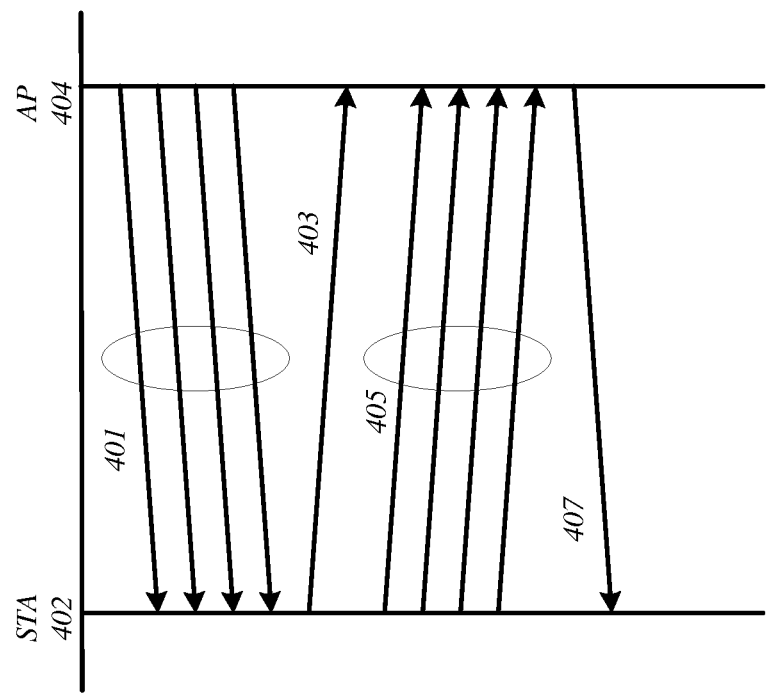
FIG. 4 illustrates an example embodiment of a second communication processing diagram.

FIG. 4 illustrates an example embodiment of a second communication diagram 400 for wireless devices, such as a STA and an AP. In this example embodiment, FIG. 4 illustrates communication occurring between a STA and an AP to perform a beamforming operation for a higher frequency band of communication while utilizing both the higher frequency band of communication and a lower frequency band of operation. For example, one or more sector sweep packets may be communicated on the higher band of communication and sector sweep feedback packets may be communicated on the lower frequency band of communication. Thus, the ability to return the sector sweep feedback information on the lower frequency band enables training one direction of the link (e.g. AP to STA) independent of the other direction (e.g. STA to AP), or vice versa. Further, using the lower frequency for the sector sweep feedback means that the feedback does not need to be carried in every sector sweep packet.

In embodiments, the communication illustrated in diagram 400 may commence in response to the communication of the beamforming start message and the ACK management message. For example, the communication illustrates in diagram 400 may start after the time period specified in the ACK management message. However, embodiments are not limited in this manner, and the communication illustrated in FIG. 4 may occur independently of the communication illustrated in FIG. 3.

At lines 401, the AP 404 may communicate training sequences in one or more sector sweep packets to the STA 402 in the higher frequency band of communication. In embodiments, the sector sweep packets may be AP transmitter (TX) sector sweep packets which may include a training sequence to train the STA's 402 receiver. In one example, the AP may communicate the sector sweep packets as a sequence of frames covering different TX sectors which may be based on the beamforming information previously communicated, as discussed above. The STA 402 may receive the sector sweep packets via an antenna which may be quasi-omni-directional antenna. In embodiments when an omni-directional antenna is used, it is possible to lengthen the preamble of the sector sweep packets to enable receiver training at the beginning of each packet. Alone or in combination with lengthen the preamble, training fields may be added to the end of the packets to enable receiver training. However, embodiments are not limited in this manner.

At line 403, the STA 402 may communicate sector sweep feedback information in one or more packets to the AP 404 in the lower frequency band of communication. The sector sweep feedback information may include a TX best sector identification (ID) and antenna ID (among other information). In some embodiments, the sector sweep feedback information may be communicated in sector sweep feedback packets and sector sweep ACK packets.

Similarly, the STA 402 may communicate training sequences in one or more sector sweep packets to the AP 404 in the higher frequency band of communication at lines 405. These sector sweep packets may be STA TX sector sweep packets which may include a training sequence to train the AP's receiver. Further, the STA 402 may communicate the sector sweep packets as a sequence of frames covering different TX sectors which may be based on the beamforming information previously communicated, as discussed above. The AP 404 may receive the sector sweep packets via an antenna which may be quasi-omni-directional antenna. Further, the sector sweep packets may include a longer preamble to enable receiver training at the beginning of each packet. In some embodiments, training fields for receiver training may be added to the end of the packets.

At line 407, the AP 404 may communicate sector sweep feedback information in one or more packets to the STA 402 in the lower frequency band of communication. The sector sweep feedback information may include a TX best sector identification (ID) and antenna ID. In some embodiments, the sector sweep feedback information may be communicated in sector sweep feedback packets and sector sweep ACK packets.

Although FIG. 4 illustrates transmit sector sweeps performed by the STA 402 and AP 404 using both the higher and lower frequency bands of communication, embodiments are not limited in this manner. In some embodiments receive training may be performed in a similar manner utilizing both the higher and lower frequency bands of communication. Further and as discussed below, by using the lower frequency band of communication to communicate the synchronization information including the beamforming information and the sector sweep feedback information the beamforming operation for the higher frequency band of communication may be performed more quickly.

Figure 5:
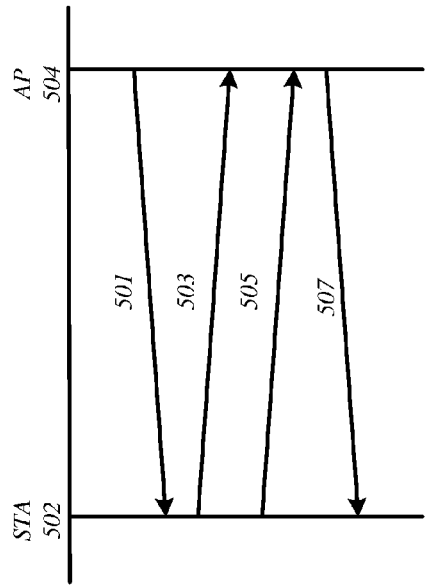
FIG. 5 illustrates example embodiments of third and fourth communication processing diagrams.
Figure 5:
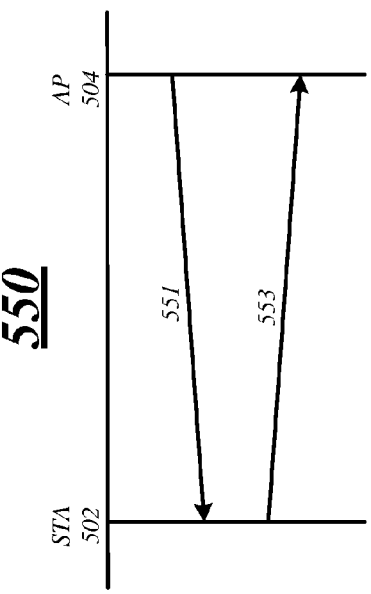

FIG. 5 illustrates example embodiments of communication diagrams 500 and 550 for wireless devices, such as a STA and an AP. For example, in communication diagram 500, a single packet or single training sequence without data may be communicated by each of the STA 502 and the AP 504 to perform a beamforming operation.

More specifically, at line 501 the AP 504 may perform a TX sector sweep by communicating a single packet in a higher frequency band of communication. The packet communicated may include a same long training sequence. Different parts of the sequence will be transmitted in each of the AP's TX sectors. These parts will be long enough to enable the receiver of the STA 502 to train (full RX sweep) on each of the TX sector sweep training sequences. At line 503, the STA 502 may communicate sector sweep feedback information on the lower band of communication to the AP 504. The sector sweep feedback information may include a TX best sector ID and antenna ID, for example. In some embodiments, the sector sweep feedback information may be communicated in a sector sweep feedback packet or sector sweep ACK packet.

The STA 502 may also perform TX sector sweep at line 505. For example, the STA 502 may communicate sector sweep information, e.g. a training sequence, in a packet on each of the TX sectors in the higher frequency band of communication. The AP 502 may receive the packet on the each of the TX sectors and perform a RX sweep to train its receiver. Further and at line 507, the AP 504 may communicate sector sweep feedback information in a packet on the lower frequency band of communication to the STA 502. The sector sweep feedback information may include a TX best sector ID and an antenna ID. Further, sector sweep feedback information may be communicated in a sector sweep feedback packet or a sector sweep ACK packet.

Communication diagram 550 illustrates a communication flow when wireless devices declare antenna pattern reciprocity. As previously discussed, the STA 502 and the AP 504 may communicate beamforming pattern reciprocity capability information in beamforming information in a lower frequency of communication. The beamforming pattern reciprocity capability information may be communicated prior to or during a beamforming operation performed for the higher frequency band of communication.

In the illustrated communication diagram 550, a single packet or training sequence may be used to train both the AP 504 TX and RX patterns and the STA 502 TX and RX patterns. More specifically, the AP 504 may perform a sector sweep by communicating a single sector sweep packet having a training sequence on each of its sectors to the STA 502 at line 551. The training information during a sector sweep may be communicated on a higher frequency band. The STA 502 may determine an RX pattern and a best TX pattern for communicating with the AP 504 based on the sector sweep and the training sequence.

At line 553, the STA 502 may communicate the sector sweep feedback information in a packet to the AP 504 on the lower frequency band at line 553. The sector sweep feedback information may include a best TX pattern and antenna ID. The AP 504 may use the information (TX pattern) received from the STA 502 to construct an RX pattern. Various embodiments are not limited in this manner.

Figure 6:
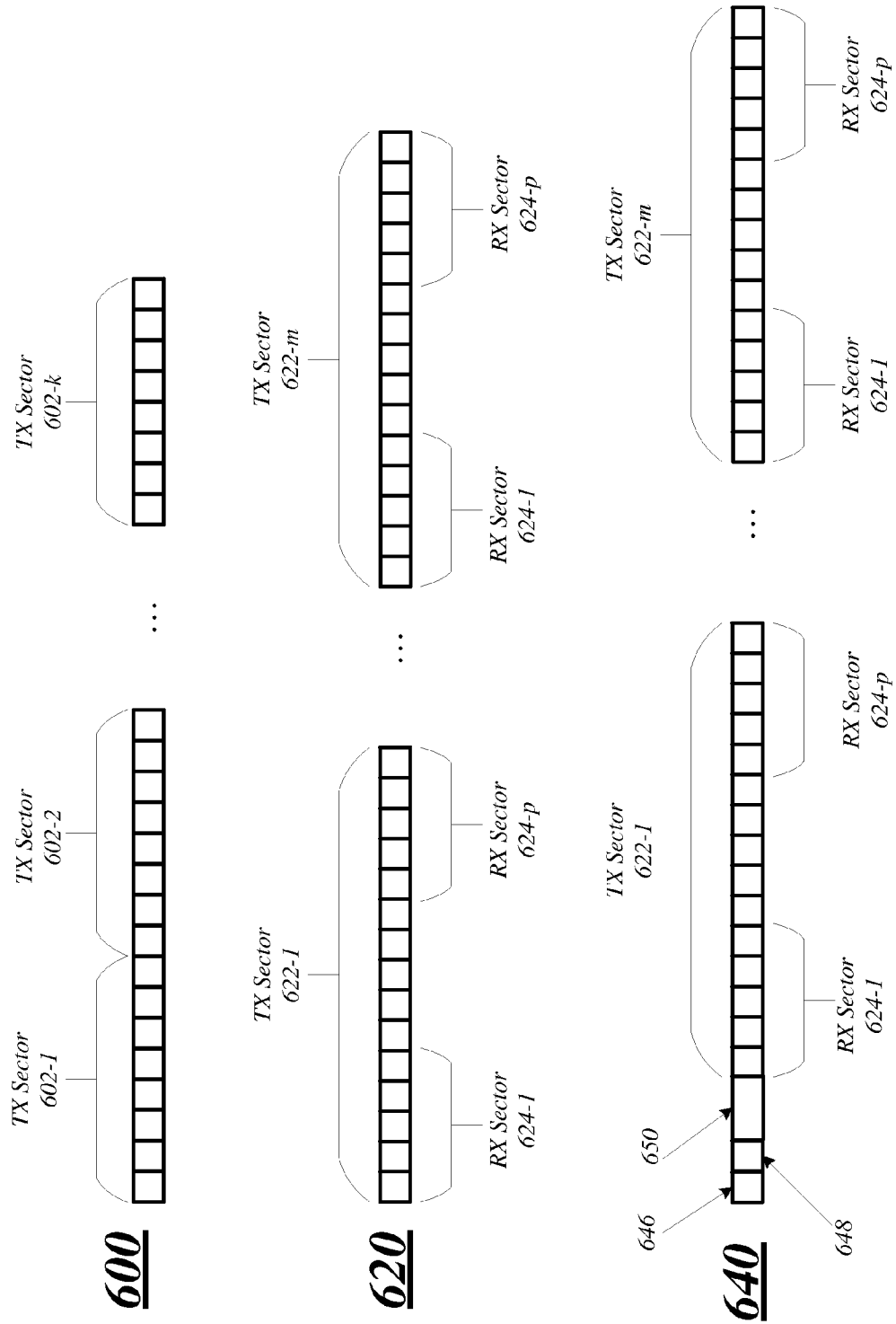
FIG. 6 illustrates an example embodiments of a training sequences.

FIG. 6 illustrates an example embodiment of training sequences 600, 620, and 640 that may be used to perform a beamforming operation. These training sequences 600, 620, and 640 may be communicated in one or more packets, such as a sector sweep packet as previously discussed. Sequence 600, 620, and 640 may be used as part of exchanges 500 and 550.

Training sequence 600 may include a typical training sequence which may include a number of TX sectors 602-1 through 602-$k$ training sequences, where k may be any positive integer. Each of the boxes of the training sequence 600 may be a Golay sequence or combination of Golay sequences. The transmitter may change the Golay sequence pattern every pre-defined number of sequences. Golay complementary sequences are sequences of bipolar symbols (±1) that have been mathematically constructed to have very specific autocorrelation properties, e.g. sum to zero.

Training sequence 620 is an example of a training sequence that may combine TX sectors and RX sectors training sequences. More specifically, training sequence 620 may include a number of TX sectors 622-1 through 622-$m$ each having a number of RX sectors 624-1 through 624-$p$, where m and p may be any positive integer which may not be the same. In this example, the TX sectors 622 sequences may be longer than the TX sectors 602 sequences discussed above in training sequence 600, but may provide an improved TX/RX combination at the end of the training or beamforming operation. Training sequence 640 may be similar to training sequence 620, but may have a preamble 646, a header 648, and data 650, which may be similar to the training sequence used in IEEE 802.11ad, for example.

Figure 7:
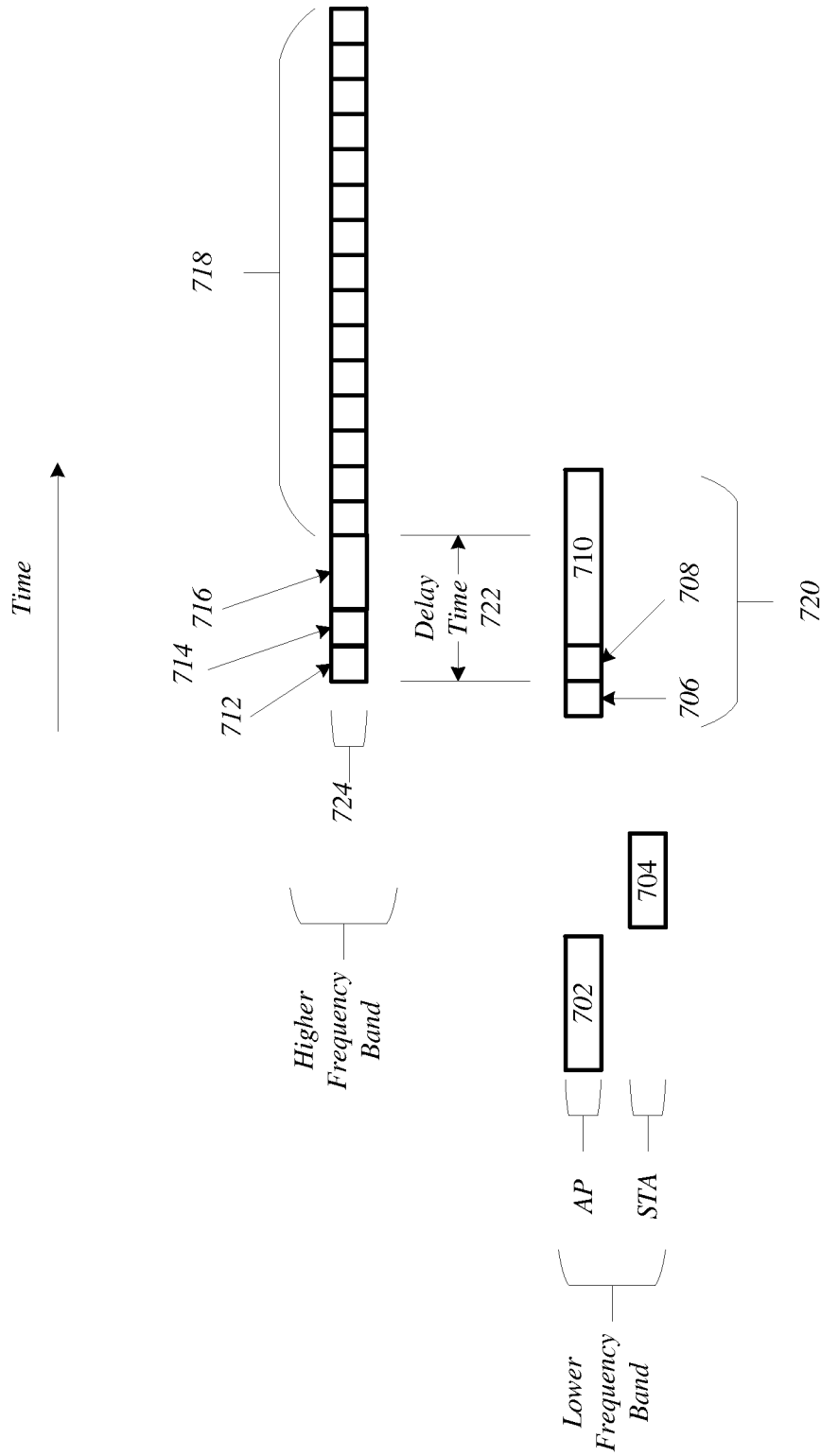
FIG. 7 illustrates an example embodiment of a communication sequence diagram.

FIG. 7 illustrates an example embodiment of a communication sequence diagram 700. More specifically, the communication sequence diagram 700 illustrates an AP and a STA communicating on a lower frequency band to initiate a beamforming operation for a higher frequency band and communicating a training packet on a higher frequency band. The sequence illustrated in FIG. 7 may occur after beamforming has been conducted on a lower frequency band, and beamforming information has been communicated between the AP and STA for the higher frequency band. The AP may communicate a start beamforming message 702 on a lower frequency band to the STA. The STA may receive the start beamforming message and may respond with an ACK management message 704 on the lower frequency band. The ACK management message may include a start time to indicate a time to commence a beamforming operation for the higher frequency band.

The AP may then issue or communicate a synchronization packet 220 on the lower frequency band to be used by both the AP and the STA to synchronize the beginning on the training sequence communicated on the higher frequency band. The synchronization packet 220 may include a preamble 706, a header 708, and data 710 and the preamble 706 may be used by the AP and the STA to base the beginning of the training sequence communicated on the higher frequency band. For example, the delay time 722, may be time between the end of the preamble 706 and the start of the training sequence 718 illustrated in FIG. 7. In some embodiments, the delay time 722 may be determined or predetermined and be based on the start time in the ACK management packet communicated on the lower frequency band. The AP may communicate the training packet 724 on the higher frequency band. The training packet 724 may include a preamble 712, a header 714, and data 716. In addition, the training packet 724 may also contain a training sequence 718 which may begin after the known time delay 722. The training packet 724 may be used by the AP and the STA to perform at least part of a beamforming operation.

Figure 8A:
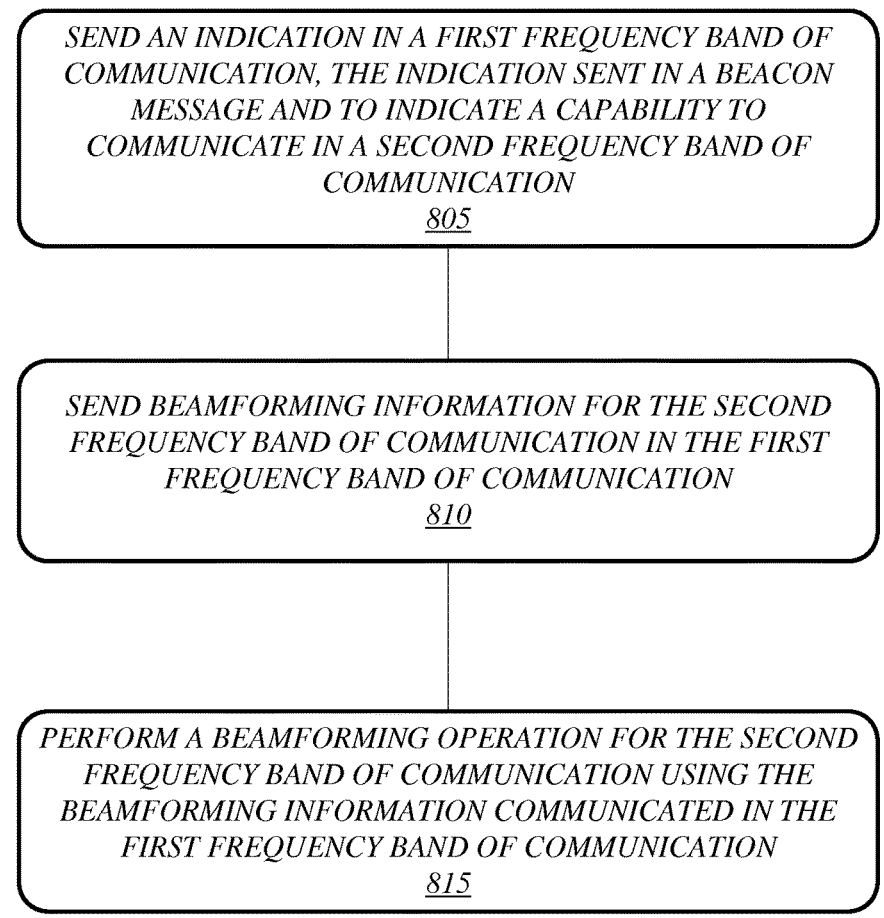
FIG. 8A illustrates an example embodiment of a logic flow diagram.

FIG. 8A illustrates an embodiment of a logic flow diagram 800. The logic flow 800 may be representative of some or all of the operations executed by one or more embodiments described herein. For example, the logic flow 800 may illustrate operations performed by one or more systems or devices in FIGS. 1 2, 9 and 10. In some embodiments, the operations illustrated in logic flow 800 may be performed by an AP or a PCP. Various embodiments are not limited in this manner.

The logic flow 800 may include sending an indication in a first frequency band of communication, the indication sent in a beacon message and to indicate a capability to communicate in a second frequency band of communication. For example an AP or a PCP may communicate a beacon message in a lower frequency of communication band (2.4 GHz or 5 GHz) that it is capable of communicating in a higher frequency band of communication (60 GHz). The indication may be received by any number of wireless device including a wireless station STA.

At block 810, the logic flow may include sending beamforming information for the second frequency band of communication in the first frequency band of communication. The beamforming information may be based on beamforming conducted for the lower frequency band of operation and may include beamforming training information, such as a number of transmitter (TX) sectors and antennas for training and a number of receiver (RX) sectors and antennas for training. Further, the beamforming information may indicate a beamforming pattern reciprocity capability.

In embodiments, the logic flow 800 may include performing a beamforming operation for the second frequency band of communication using the beamforming information communicated in the first frequency band of communication at block 815. For example, the AP and the STA may perform a beamforming operation by communicating one or more sector sweep packets in a higher frequency band of operation. The one or more sector sweep packets may be communicated in sectors towards a direction based on the beamforming information communicated in the lower frequency band of operation. The AP and the STA may also utilize the lower frequency band of communication to communicate sector sweep feedback packets on during the beamforming operation. Embodiments are not limited in this manner.

FIG. 8B illustrates an embodiment of a logic flow diagram 850. The logic flow 850 may be representative of some or all of the operations executed by one or more embodiments described herein. For example, the logic flow 850 may illustrate operations performed by one or more systems or devices in FIGS. 1 2, 9 and 10. In some embodiments, the operations illustrated in logic flow 850 may be performed by a wireless station (STA). Various embodiments are not limited in this manner.

The logic flow 800 may include sending an indication in a first frequency band of communication, the indication sent in a probe request and to indicate a capability to communicate in a second frequency band of communication at block 855. For example STA may communicate a probe request in a lower frequency of communication band (2.4 GHz or 5 GHz) indicating that it is capable of communicating in a higher frequency band of communication (60 GHz). The indication may be received by an AP or PCP, and in some embodiments, may be in response to receive a similar indication in a beacon message.

At block 860, the logic flow may include sending beamforming information for the second frequency band of communication in the first frequency band of communication. The beamforming information may be based on beamforming conducted for the lower frequency band of operation and may include beamforming training information, such as a number of transmitter (TX) sectors and antennas for training and a number of receiver (RX) sectors and antennas for training. Further, the beamforming information may indicate a beamforming pattern reciprocity capability.

In embodiments, the logic flow 850 may include performing a beamforming operation for the second frequency band of communication using the beamforming information communicated in the first frequency band of communication at block 865. For example, the AP and the STA may perform a beamforming operation by communicating one or more sector sweep packets in a higher frequency band of operation. The one or more sector sweep packets may be communicated in sectors towards a direction based on the beamforming information communicated in the lower frequency band of operation. The AP and the STA may also utilize the lower frequency band of communication to communicate sector sweep feedback packets on during the beamforming operation. Embodiments are not limited in this manner.

Figure 9:
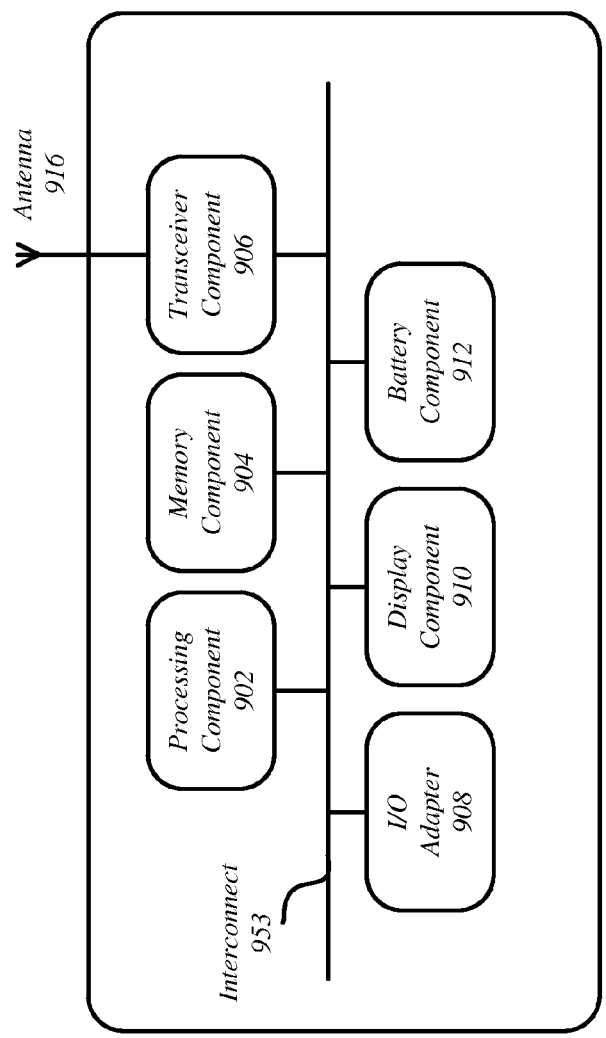
FIG. 9 illustrates an example embodiment of a computing device.

FIG. 9 illustrates an embodiment of a computing device 905. In various embodiments, computing device 905 may be representative of a computing device or system for use with one or more embodiments described herein, such as those discussed in FIGS. 1-8B.

In various embodiments, computing device 905 may be any type of computing device including a computing device including a personal computer (PC), laptop computer, ultra-laptop computer, netbook computer, ultrabook computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a computing device 905 also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a computing device 905 may be implemented as a smart phone capable of executing computer applications, as well as voice communications and/or data communications. Although some embodiments may be described with a computing device 905 implemented as a smart phone by way of example, it may be appreciated that other embodiments may be implemented using other wireless mobile computing devices as well. The embodiments are not limited in this context. In some embodiments, computing device 905 may also be a navigation system, infotainment system, embedded in home appliances, etc.

As shown in FIG. 9, computing device 905 may include multiple elements. One or more elements may be implemented using one or more circuits, components, registers, processors, software subroutine modules, or any combination thereof, as desired for a given set of design or performance constraints. Although FIG. 9 shows a limited number of elements in a certain topology by way of example, it can be appreciated that more or less elements in any suitable topology may be used in computing device 905 as desired for a given implementation. The embodiments are not limited in this context.

In various embodiments, computing device 905 may include one or more processing unit(s) 902. Processing unit(s) 902 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit or processing circuitry. The processing unit(s) 902 may be connected to and communicate with the other elements and components of the computing system via an interconnect 543, such as one or more buses, control lines, and data lines.

In one embodiment, computing device 905 may include memory 904 to couple to processing unit(s) 902. In various embodiments, the memory 904 may store data and information for use by the computing device 905.

Memory 904 may be coupled to processing unit(s) 902 via interconnect 853, or by a dedicated communications bus between processing unit(s) 902 and memory 904, as desired for a given implementation. Memory 904 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 904 can store instructions and data momentarily, temporarily, or permanently. The memory 904 may also store temporary variables or other intermediate information while the processing unit(s) 902 is executing instructions. The memory 904 is not limited to storing the above discussed data and may store any type of data.

The computing device 905 may include a transceiver 906 which includes one or more components and circuitry to transmit and receive information using radio-frequency signals. More specifically, the transceiver 906 may include circuitry to produce radio-frequency mobile radio signals which are to be sent and for processing radio-frequency mobile radio signals which have been received. To this end, the transceiver 906 may be coupled to one or more antenna 816. The transmitted or received mobile radio signals are in one or more particular frequency ranges, which are typically prescribed by the mobile radio standard(s) supported by the radio-frequency assemblies. For example, transceiver 906 may include circuitry to process information according to one or more IEEE standards, one or more peer-to-peer protocols, and so forth. Various embodiments are not limited in this manner and transceiver 906 may transmit or receive information via any standard in any frequency range with one more devices, as previously mentioned.

In various embodiments, the transceiver 906 may be used to communicate with one or more other devices or stations via one or more antennas 916. The transceiver 906 may send and receive information from the stations as one or more pockets, frames, and any other transmission structure in accordance with one or more protocols.

The computing device 905 may include input/output adapter 908. Examples of I/O adapter 908 may include Universal Serial Bus (USB) ports/adapters, IEEE 1394 Firewire ports/adapters, and so forth. The embodiments are not limited in this context.

For example, an I/O adapter 908 may also include an input device or sensor, such as one or more buttons, a keyboard, a keypad, a touchscreen display, a touch sensitive device, a microphone, a biometric finger printer reader, biometric eye scanner or any other device used for inputting information into computing device 905. Moreover, the I/O adapter 908 may be a sensor including any hardware or logic to detect one or more touches or inputs on or near a housing of the apparatus, a display of the apparatus including a touchscreen or touch sensitive display.

In various embodiments, the I/O adapter 908 may include one or more components to output information to a user. For example, the I/O adapter 908 may include a speaker to output an audible noise or a haptic feedback device to output a vibration. The I/O adapter 908 may be located any within or on computing device 905, or may be separate and connected to the computing device 905 via a wired or wireless connection.

The computing device 905 may also include a display 910. Display 910 may constitute any display device capable of displaying information received from processor units 902, such as liquid crystal display (LCD), cathode ray tube (CRT) display, a projector, and so forth. Various embodiments are not limited in this manner.

The computing device 905 may also include storage 912. Storage 912 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 912 may include technology to increase the storage performance enhanced protection for valuable digital media when multiple hard drives are included, for example. Further examples of storage 912 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

Figure 10:
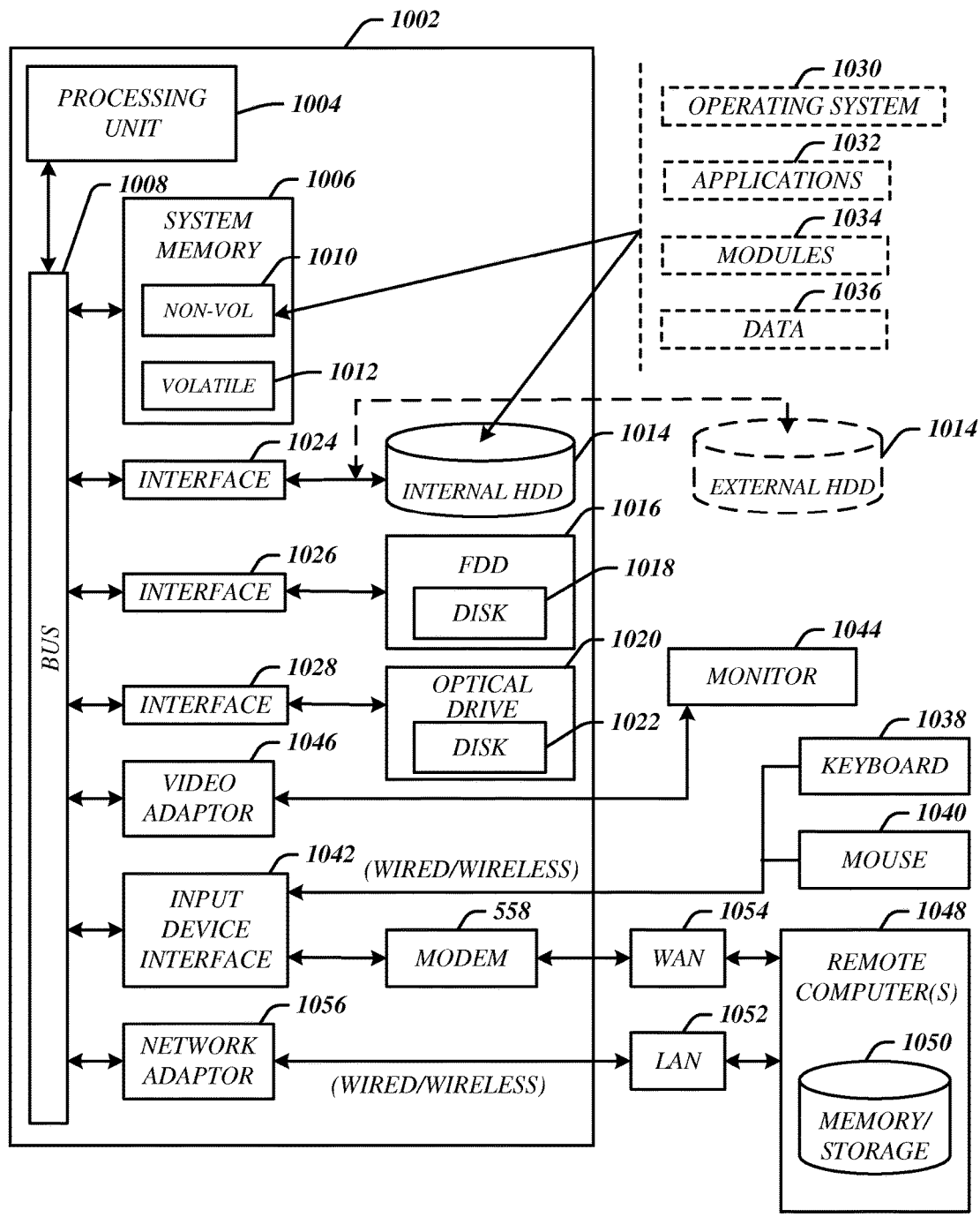
FIG. 10 illustrates an example embodiment of a computing architecture.

FIG. 10 illustrates an embodiment of an exemplary computing architecture 1000 suitable for implementing various embodiments as previously described. In one embodiment, the computing architecture 1000 may include or be implemented as part of system 105.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 includes a processing unit 1004, a system memory 1006 and a system bus 1008. The processing unit 1004 can be any of various commercially available processors.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the devices in FIGS. 1-9.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 558, or is connected to a communications server on the WAN 1054, or has other means for establishing communications over the WAN 1054, such as by way of the Internet. The modem 558, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 1002 family of standards, such as wireless devices operatively disposed in wireless communication (e.g., IEEE 1002.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 1002.11x (a, b, g, n, etc.) to provide secure, reliable, fast wireless connectivity. A Wi-Fi network can be used to connect computers to each other, to the Internet, and to wire networks (which use IEEE 1002.3-related media and functions).

Figure 11:
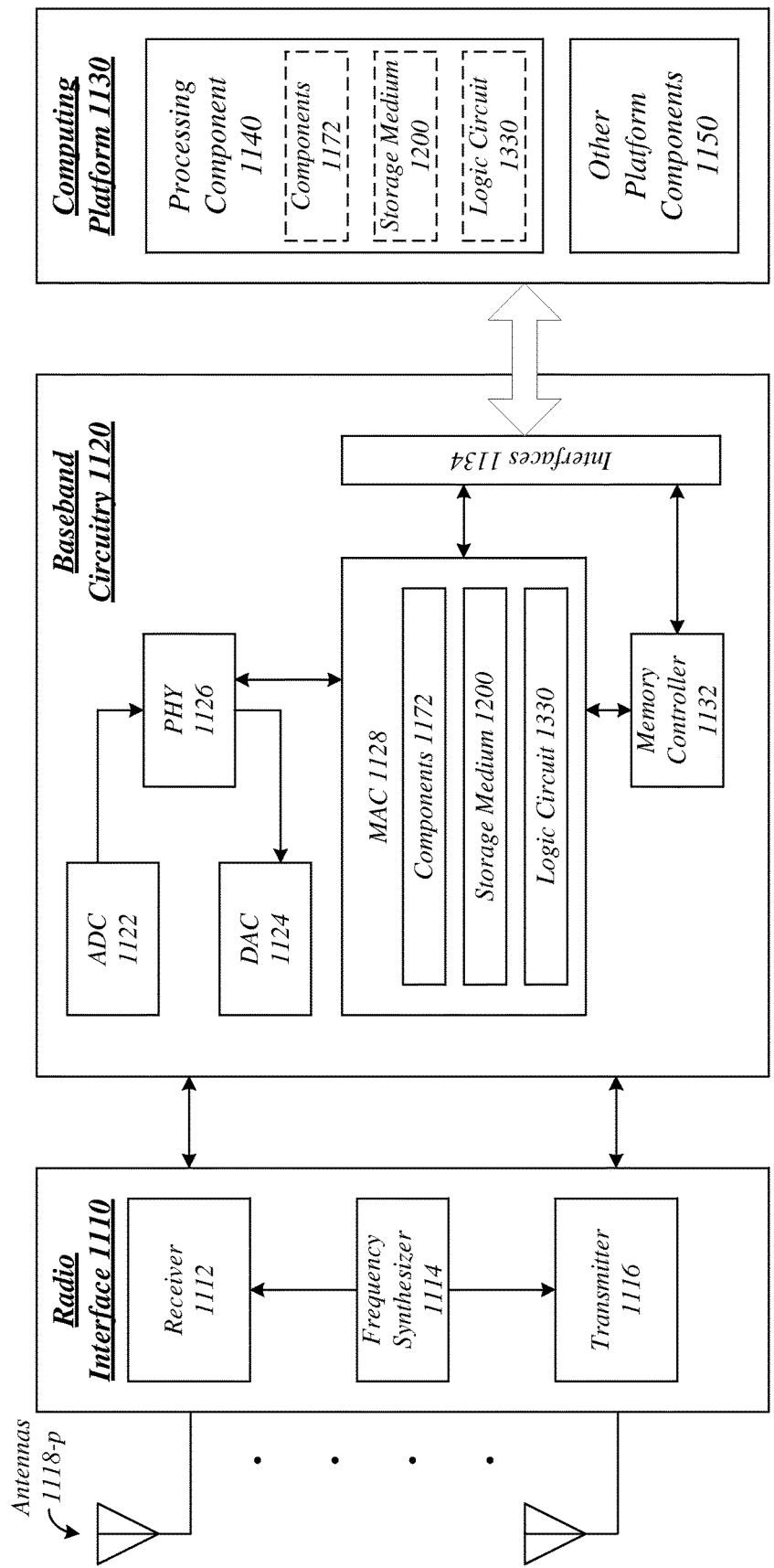
FIG. 11 illustrates an example embodiment of a second computing architecture.

FIG. 11 illustrates an embodiment of a device 1100 for use in a WLAN system, such as the wireless networks illustrated in FIGS. 1 and 2. Device 1100 may implement, for example, the wireless stations 104, access points, storage medium 1200 and/or a logic circuit 1330. The logic circuit 1330 may include physical circuits to perform operations described for the wireless stations 104 or the access points. As shown in FIG. 11, device 1100 may include a radio interface 1110, baseband circuitry 1120, and computing platform 1130, although embodiments are not limited to this configuration.

The device 1100 may implement some or all of the structure and/or operations for the wireless stations, access points, storage medium 1200 and/or a logic circuit 1330 in a single computing entity, such as entirely within a single device. Alternatively, the device 1100 may distribute portions of the structure and/or operations for the wireless stations 104, access points, storage medium 1200 and/or a logic circuit 1330 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118-$p$. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the wireless stations 104, access points, storage medium 1200, and logic circuit 1330 using the processing component 1130. The processing component 1130 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the standards previously discussed, cited herein, although the embodiments are not limited in this respect.

Embodiments of device 1100 may be implemented using single input single output (SISO) architectures. However, certain implementations may include multiple antennas (e.g., antennas 1118-*p*) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

The various elements of the system and devices as previously described with reference to FIGS. 1-11 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, device, controller, or an apparatus includes one or more transceivers, and circuitry coupled to the one or more transceivers. The circuitry may send, via one of the one or more transceivers, an indication in a first frequency band of communication, the indication sent in a beacon message and to indicate a capability to communicate in a second frequency band of communication, send, via one of the one or more transceivers, beamforming information for the second frequency band of communication in the first frequency band of communication, the beamforming information comprising information based on beamforming for the first frequency band of communication, and perform a beamforming operation for the second frequency band of communication using the beamforming information communicated in the first frequency band of communication.

In a second example and in furtherance of the first example, a system, device, controller, or an apparatus may include an access point comprising the circuitry, the one or more transceivers, and at least one antenna, and the first frequency band of communication comprising a lower band of communication in one of a 2.4 gigahertz (GHz) band and a 5 GHz band, and the second frequency band of communication comprising a higher band of communication in a 60 gigahertz (GHz) band.

In a third example and in furtherance of any of the previous examples, a system, device, controller, or an apparatus may include circuitry to receive a second indication of a capability of another device to communicate in the second frequency band of communication, the second indication received in a probe request in the first frequency band of communication.

In a fourth example and in furtherance of any of the previous examples, a system, device, controller, or an apparatus may include circuitry to send a start beamforming message in one or more packets in the first frequency band of communication to initiate the beamforming operation, and receive an acknowledgement (ACK) management packet in the first frequency band of communication, the ACK management packet comprising an amount of time to wait after the end of the ACK management packet before commencing the beamforming operation.

In a fifth example and in furtherance of any of the previous examples, a system, device, controller, or an apparatus may include circuitry to send a synchronization packet in the first frequency band of communication, the synchronization packet comprising a preamble, a header, and data, and the circuitry to send a training sequence of a training packet after a delay time from the conclusion of the preamble of the synchronization packet.

In a sixth example and in furtherance of any of the previous examples, a system, device, controller, or an apparatus may include the beamforming operation to cause the circuitry to send one or more sector sweep packets in the second frequency band of communication, and receive a sector sweep feedback packet in the first frequency band of communication.

In a seventh example and in furtherance of any of the previous examples, a system, device, controller, or an apparatus may include the beamforming operation to cause the circuitry to receive one or more sector sweep packets in the second frequency band of communication, and send a sector sweep feedback packet in the first frequency band of communication.

In an eighth example and in furtherance of any of the previous examples, a system, device, controller, or an apparatus may include the beamforming operation to cause the circuitry to send a single sector sweep packet on each sector, receive a sector sweep feedback packet, and determine a transmit pattern and a receive pattern based on the sent single sector sweep packet and the received sector sweep feedback packet.

In a ninth example and in furtherance of any of the previous examples, at least one non-transitory computer-readable storage medium comprising instructions that when executed cause processing circuitry to send an indication in a first frequency band of communication, the indication to indicate a capability to communicate in a second frequency band of communication, send beamforming information for the second frequency band of communication in the first frequency band of communication, and perform a beamforming operation for the second frequency band of communication using the beamforming information communicated in the first frequency band of communication.

In a tenth example and in furtherance of any of the previous examples, at least one non-transitory computer-readable storage medium comprising instructions that when executed cause processing circuitry to may process information in the first frequency band of communication comprising a lower band of communication in at least one of a 2.4 gigahertz (GHz) band and a 5 GHz band, and the second frequency band of communication comprising a higher band of communication in a 60 GHz band.

In an eleventh example and in furtherance of any of the previous examples, at least one non-transitory computer-readable storage medium comprising instructions that when executed cause processing circuitry to send the indication of the capability in a beacon message in the first frequency band of communication, and receive an indication of a capability of another device to communicate in a second frequency band of communication in a probe request in the first frequency band of communication.

In a twelfth example and in furtherance of any of the previous examples, at least one non-transitory computer-readable storage medium comprising instructions that when executed cause processing circuitry to send a start beamforming message in one or more packets in the first frequency band of communication to initiate the beamforming operation, and receive an acknowledgement (ACK) management packet in the first frequency band of communication, the ACK management packet comprising an amount of time to wait after the end of the ACK management packet before commencing the beamforming operation.

In a thirteenth example and in furtherance of any of the previous examples, at least one non-transitory computer-readable storage medium comprising instructions that when executed cause processing circuitry to send a synchronization packet in the lower band of communication, the synchronization packet comprising a preamble, a header, and data, and send a training sequence of a training packet after a delay time from the conclusion of the preamble of the synchronization packet.

In a fourteenth example and in furtherance of any of the previous examples, at least one non-transitory computer-readable storage medium comprising instructions that when executed cause processing circuitry to send one or more sector sweep packets in the second frequency band of communication, and receive a sector sweep feedback packet in the first frequency band of communication.

In a fifteenth example and in furtherance of any of the previous examples, at least one non-transitory computer-readable storage medium comprising instructions that when executed cause processing circuitry to receive one or more sector sweep packets in the second frequency band of communication, and send a sector sweep feedback packet in the first frequency band of communication.

In a sixteenth example and in furtherance of any of the previous examples, at least one non-transitory computer-readable storage medium comprising instructions that when executed cause processing circuitry to send only a single sector sweep packet on each of sector, receive a sector sweep feedback packet, and determine a transmit pattern and a receive pattern based on the sent single sector sweep packet and the received sector sweep feedback packet.

In a seventeenth example and in furtherance of any of the previous examples, a system, device, controller, or an apparatus may include one or more transceivers, and circuitry coupled to the one or more transceiver. The circuitry to send, via one of the one or more transceivers, an indication in a first frequency band of communication, the indication sent in a probe request and to indicate a capability to communicate in a second frequency band of communication, send, via one of the one or more transceivers, beamforming information for the second frequency band of communication in the first frequency band of communication, the beamforming information comprising information based on beamforming for the first frequency band of communication, and perform a beamforming operation for the second frequency band of communication using the beamforming information communicated in the first frequency band of communication.

In an eighteenth example and in furtherance of any of the previous examples, a system, device, controller, or an apparatus may include a wireless station comprising the circuitry, the one or more transceivers, and at least one antenna.

In a nineteenth example and in furtherance of any of the previous examples, a system, device, controller, or an apparatus may include circuitry to receive a second indication of a capability of another device to communicate in the second frequency band of communication, the second indication received in a beacon message in the first frequency band of communication.

In a twentieth example and in furtherance of any of the previous examples, a system, device, controller, or an apparatus may include circuitry to receive a start beamforming message to initiate the beamforming operation in one or more packets in the first frequency band of communication, and send an acknowledgement (ACK) management packet in the first frequency band of communication, the ACK management packet comprising an amount of time to wait after the end of the ACK management packet before the beamforming operation commences.

In a twenty-first example and in furtherance of any of the previous examples, a system, device, controller, or an apparatus may include circuitry to receive a synchronization packet in the first frequency band of communication, the synchronization packet comprising a preamble, a header, and data, and receive a training sequence after a delay time from the conclusion of the received preamble of the synchronization packet.

In a twenty-second example and in furtherance of any of the previous examples, a system, device, controller, or an apparatus may include circuitry to perform a beamforming operation to cause the circuitry to receive one or more sector sweep packets in the second frequency band of communication, and send a sector sweep feedback packet in the first frequency band of communication.

In a twenty-third example and in furtherance of any of the previous examples, a system, device, controller, or an apparatus may include the circuitry to send one or more sector sweep packets in the second frequency band of communication, and receive a sector sweep feedback packet in the first frequency band of communication.

In a twenty-fourth example and in furtherance of any of the previous examples, a system, device, controller, or an apparatus may include the circuitry to receive a single sector sweep packet in each sector, send a sector sweep feedback packet, and determine a transmit pattern and a receive pattern based in the received single sector sweep packet and the sent sector sweep feedback packet.

In a twenty-fifth example and in furtherance of any of the previous examples, a system, device, or an apparatus a first device, a second device, and the first and second devices to communicate first and second indications in a first frequency band of communication, the first and second indications to indicate a capability to communicate in a second frequency band of communication, communicate beamforming information for the second frequency band of communication in the first frequency band of communication, and perform a beamforming operation for the second frequency band of communication using the beamforming information communicated in the first frequency band of communication.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   one or more transceivers; and
   circuitry coupled to the one or more transceivers, the circuitry to:
   send, via one of the one or more transceivers, an indication in a first frequency band of communication, the indication sent in a beacon message and to indicate a capability to communicate in a second frequency band of communication,
   send, via one of the one or more transceivers, beamforming information for the second frequency band of communication in the first frequency band of communication, the beamforming information comprising information based on beamforming for the first frequency band of communication,
   send a synchronization packet in the first frequency band of communication, the synchronization packet comprising a preamble, a header, and data; and
   perform a beamforming operation for the second frequency band of communication using the beamforming information communicated in the first frequency band of communication, the beamforming operation comprising sending a training sequence of a training packet on the second frequency band after a delay time, wherein the delay time is time between conclusion of the preamble of the synchronization packet and start of the training sequence of the training packet, and wherein the first frequency band of communication comprising a lower band of communication in at least one of a 2.4 gigahertz (GHz) band and a 5 GHz band, and the second frequency band of communication comprising a higher band of communication in a 60 GHz band.

2. The apparatus of claim 1, the circuitry to receive a second indication of a capability of another device to communicate in the second frequency band of communication, the second indication received in a probe request in the first frequency band of communication.

3. The apparatus of claim 1, the circuitry to:
   send a start beamforming message in one or more packets in the first frequency band of communication to initiate the beamforming operation; and
   receive an acknowledgement (ACK) management packet in the first frequency band of communication, the ACK management packet comprising an amount of time to wait after an end of the ACK management packet before commencing the beamforming operation.

4. The apparatus of claim 1, the beamforming operation to cause the circuitry to send one or more sector sweep packets in the second frequency band of communication, and receive a sector sweep feedback packet in the first frequency band of communication.

5. The apparatus of claim 4, the beamforming operation to cause the circuitry to receive one or more sector sweep packets in the second frequency band of communication, and send a sector sweep feedback packet in the first frequency band of communication.

6. The apparatus of claim 5, the beamforming operation to cause the circuitry to send a single sector sweep packet on each sector, receive a sector sweep feedback packet, and determine a transmit pattern and a receive pattern based on the sent single sector sweep packet and the received sector sweep feedback packet.

7. At least one non-transitory computer-readable storage medium comprising instructions that when executed cause processing circuitry to:
send an indication in a first frequency band of communication, the indication to indicate a capability to communicate in a second frequency band of communication;
send beamforming information for the second frequency band of communication in the first frequency band of communication;
send a synchronization packet in the first frequency band of communication, the synchronization packet comprising a preamble, a header, and data; and
perform a beamforming operation for the second frequency band of communication using the beamforming information communicated in the first frequency band of communication, the beamforming operation comprising sending a training sequence of a training packet on the second frequency band after a delay time, wherein the delay time is time between conclusion of the preamble of the synchronization packet and start of the training sequence of the training packet, and wherein the first frequency band of communication comprising a lower band of communication in at least one of a 2.4 gigahertz (GHz) band and a 5 GHz band, and the second frequency band of communication comprising a higher band of communication in a 60 GHz band.

8. The at least one non-transitory computer-readable storage medium of claim 7, comprising instructions that when executed cause processing circuitry to:
send the indication of the capability in a beacon message in the first frequency band of communication; and
receive an indication of a capability of another device to communicate in a second frequency band of communication in a probe request in the first frequency band of communication.

9. The at least one non-transitory computer-readable storage medium of claim 7, comprising instructions that when executed cause processing circuitry to:
send a start beamforming message in one or more packets in the first frequency band of communication to initiate the beamforming operation; and
receive an acknowledgement (ACK) management packet in the first frequency band of communication, the ACK management packet comprising an amount of time to wait after an end of the ACK management packet before commencing the beamforming operation.

10. The at least one non-transitory computer-readable storage medium of claim 7, the beamforming operation to cause the circuitry to send one or more sector sweep packets in the second frequency band of communication, and receive a sector sweep feedback packet in the first frequency band of communication.

11. The at least one non-transitory computer-readable storage medium of claim 10, the beamforming operation to cause the circuitry to receive one or more sector sweep packets in the second frequency band of communication, and send a sector sweep feedback packet in the first frequency band of communication.

12. The at least one non-transitory computer-readable storage medium of claim 7, the beamforming operation to cause the circuitry to send only a single sector sweep packet on each of sector, receive a sector sweep feedback packet, and determine a transmit pattern and a receive pattern based on the sent single sector sweep packet and the received sector sweep feedback packet.

13. An apparatus, comprising:
one or more transceivers;
circuitry coupled to the one or more transceiver, the circuitry to:
send, via one of the one or more transceivers, an indication in a first frequency band of communication, the indication sent in a probe request and to indicate a capability to communicate in a second frequency band of communication,
send, via one of the one or more transceivers, beamforming information for the second frequency band of communication in the first frequency band of communication, the beamforming information comprising information based on beamforming for the first frequency band of communication,
send a synchronization packet in the first frequency band of communication, the synchronization packet comprising a preamble, a header, and data, and
perform a beamforming operation for the second frequency band of communication using the beamforming information communicated in the first frequency band of communication, the beamforming operation comprising sending a training sequence of a training packet on the second frequency band after a delay time, wherein the delay time is time between conclusion of the preamble of the synchronization packet and start of the training sequence of the training packet, and wherein the first frequency band of communication comprising a lower band of communication in at least one of a 2.4 gigahertz (GHz) band and a 5 GHz band, and the second frequency band of communication comprising a higher band of communication in a 60 GHz band.

14. The apparatus of claim 13, the circuitry to receive a second indication of a capability of another device to communicate in the second frequency band of communication, the second indication received in a beacon message in the first frequency band of communication.

15. The apparatus of claim 13, the circuitry to:
receive a start beamforming message to initiate the beamforming operation in one or more packets in the first frequency band of communication; and
send an acknowledgement (ACK) management packet in the first frequency band of communication, the ACK management packet comprising an amount of time to wait after the end of the ACK management packet before the beamforming operation commences.

16. The apparatus of claim 13, the beamforming operation to cause the circuitry to receive one or more sector sweep packets in the second frequency band of communication, and send a sector sweep feedback packet in the first frequency band of communication.

17. The apparatus of claim 16, the beamforming operation to cause the circuitry to send one or more sector sweep packets in the second frequency band of communication, and receive a sector sweep feedback packet in the first frequency band of communication.

18. The apparatus of claim 13, the beamforming operation to cause the circuitry to receive a single sector sweep packet in each sector, send a sector sweep feedback packet, and determine a transmit pattern and a receive pattern based in the received single sector sweep packet and the sent sector sweep feedback packet.

* * * * *